Nov. 3, 1931.  L. S. FRAPPIER ET AL  1,830,601
SOUND TELESCOPE
Filed Oct. 3, 1928  3 Sheets-Sheet 1

Inventor
LOUIS S. FRAPPIER
EWALD BOECKING
By their Attorney
Howard L. O. Dix

Nov. 3, 1931.  L. S. FRAPPIER ET AL  1,830,601
SOUND TELESCOPE
Filed Oct. 3, 1928  3 Sheets-Sheet 2
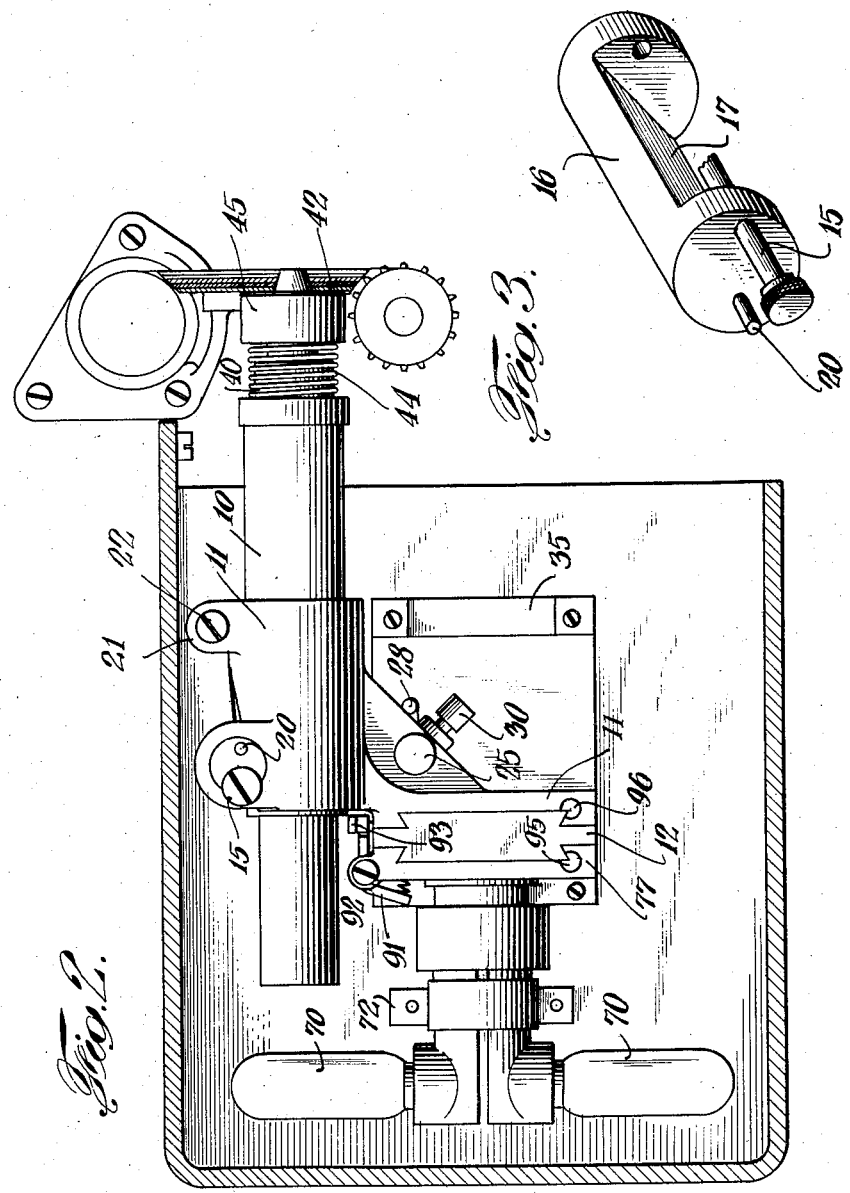
Inventors
LOUIS S. FRAPPIER
EWALD BOECKING
By their Attorney
Howard W. Dix Nov. 3, 1931.   L. S. FRAPPIER ET AL   1,830,601
SOUND TELESCOPE
Filed Oct. 3, 1928   3 Sheets-Sheet 3
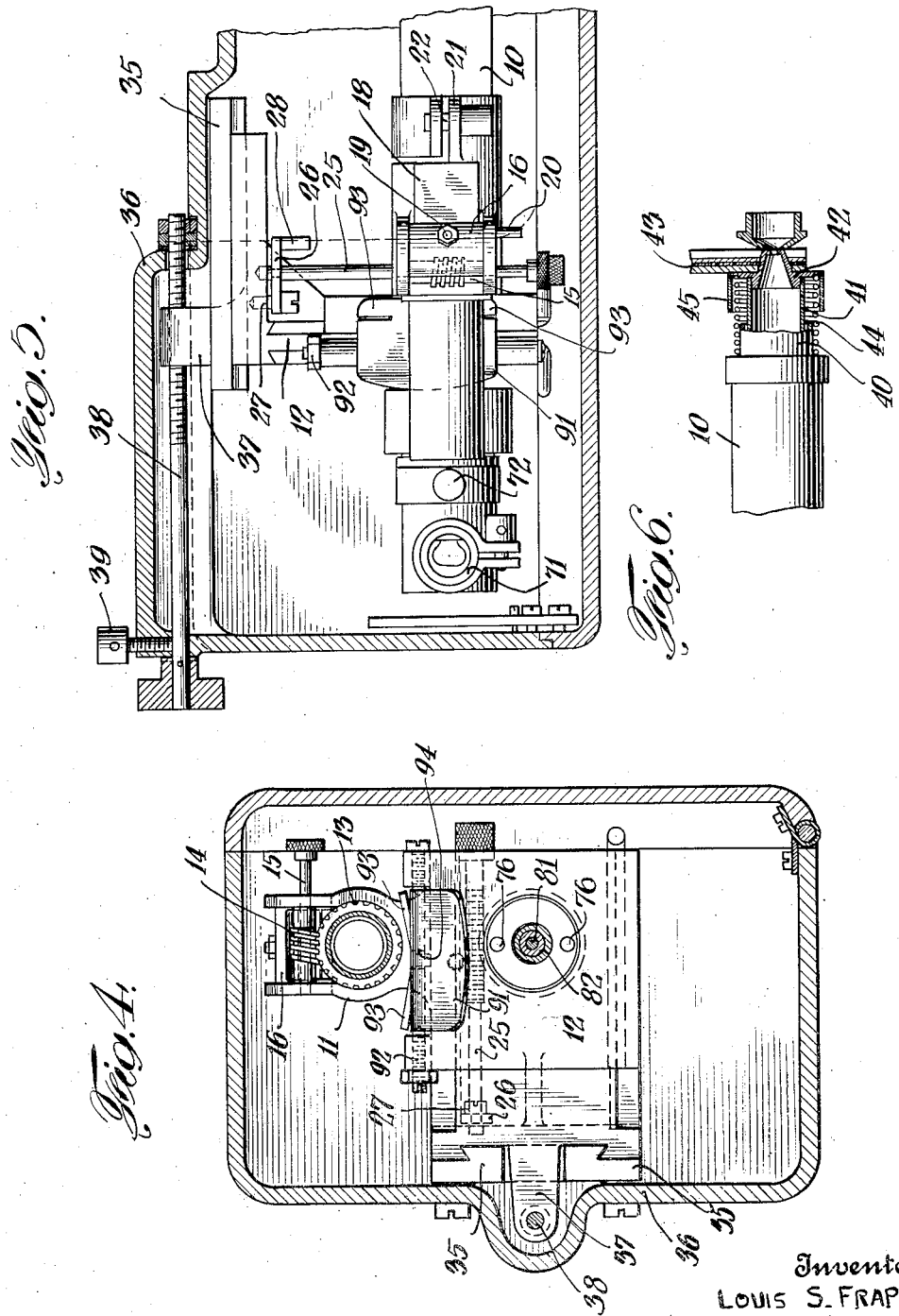

Patented Nov. 3, 1931

1,830,601

UNITED STATES PATENT OFFICE

LOUIS SIMON FRAPPIER AND EWALD BOECKING, OF BROOKLYN, NEW YORK, ASSIGNORS TO INTERNATIONAL PROJECTOR CORPORATION, OF NEW YORK, N. Y., A CORPORATION OF DELAWARE

SOUND TELESCOPE

Application filed October 3, 1928. Serial No. 310,024.

This invention relates to an apparatus for reproducing sound from a photographic record, and more particularly to a device to be operated in conjunction with a motion picture projection machine for simultaneously projecting a picture and reproducing sound.

This application is a continuation in part of our copending application, Serial No. 303,162, filed August 31, 1928, for improvements in projection machine.

The invention specifically provides a telescope for directing rays of light on to a photographic sound record which may be contained on a movable film. New and improved means are included for adjusting the telescope whereby the rays may be properly focused and for maintaining the telescope in its adjusted position.

An object of the invention is to provide telescopic means for reproducing a sound record in synchronism with a projected picture.

Another object is to provide for simple and accurate adjustment of the telescopic means whereby the light rays may be projected through the sound record and focused upon a light sensitive cell.

A further object is to provide a device of the above described character which may be readily removed from the assembly for purposes of inspection and repair.

A still further object is to provide means for passing the desired light rays through the photographic sound record and for positively excluding undesired rays from said record.

The above objects and others which will be apparent as the nature of the invention is disclosed, are accomplished by rotatably mounting the telescope in a suitable framework and providing positive means for varying the angular position of the telescope therein. The framework is mounted for movement in a horizontal direction transverse to the axis of the telescope by means of a suitable sliding bracket. The bracket itself may be moved horizontally in a direction parallel to the axis of the telescope.

In order to exclude external light from the photographic record, a pair of telescoping members are included between the end of the telescope itself and the sound record and are provided with means for maintaining a positive engagement with both the telescope and the film guide. A special light source is also provided which includes a pair of lights and means for alternately bringing said lights into operative position. A second light is accordingly always held in reserve and may be substituted in the system without material interruption of service.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a vertical section showing a telescope and light source constructed in accordance with the present invention;

Fig. 2 is a side elevation of the telescope and light source;

Fig. 3 is an enlarged detail view of a portion of the telescope adjusting mechanism;

Fig. 4 is a transverse sectional view taken along the lines 4—4 of Fig. 1;

Fig. 5 is a horizontal section of the telescope chamber showing the telescope and adjusting mechanism in plan and Fig. 6 is a detailed sectional view of the aperture plate and a portion of the telescope associated therewith.

Like reference characters denote like parts in the several figures of the drawings.

Figure 1:
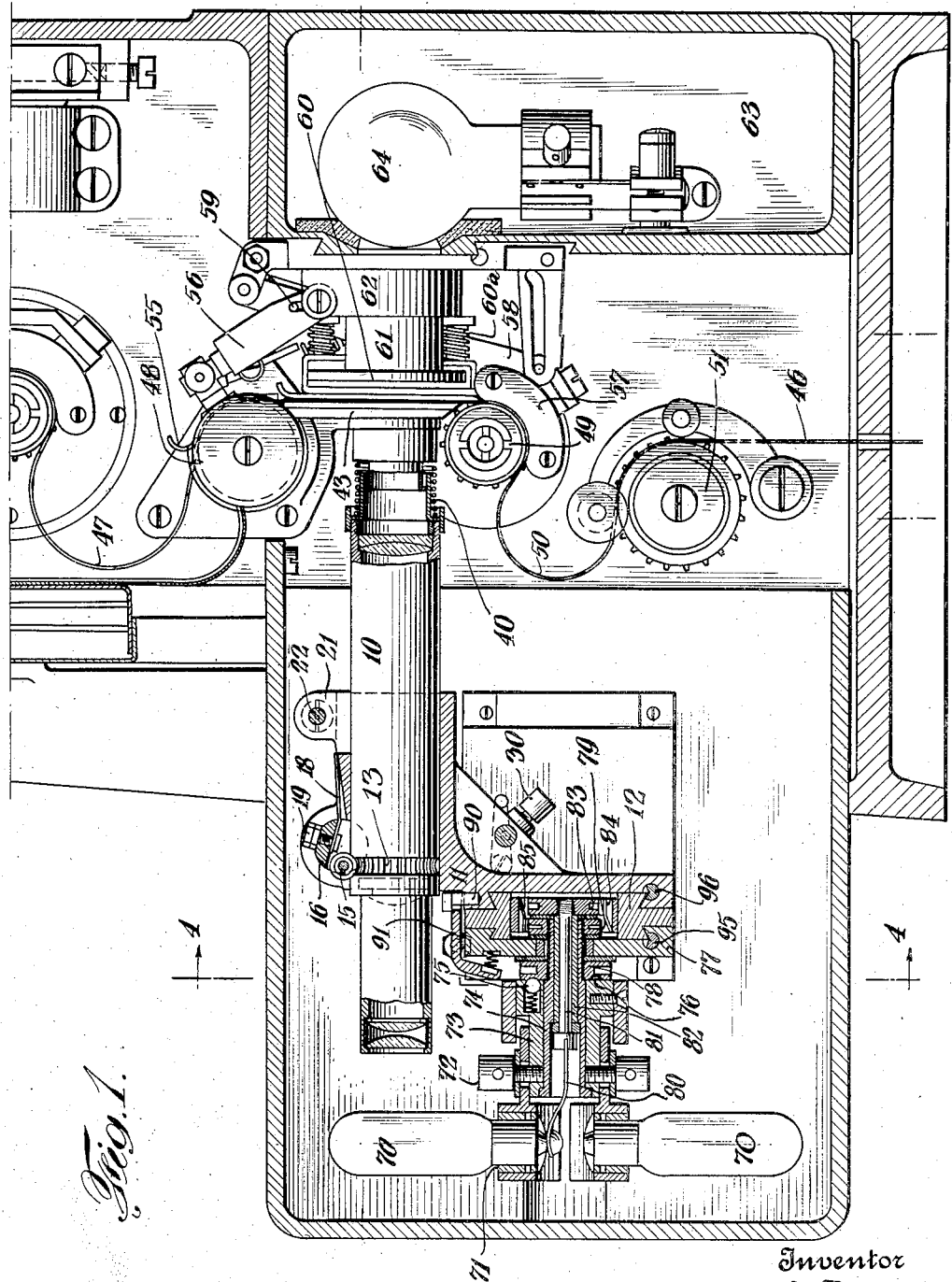

In the following description and in the claims parts will be identified by specific names for convenience, but they are intended to be as generic in their application to similar parts as the art will permit.

Referring to the drawings more in detail, telescope 10 is rotatably mounted in a frame 11 which is in turn slidably supported on bracket 12. Telescope 10 may be rotatably adjusted in said frame 11 by means of rack 13 and worm gear 14 cooperating therewith.

Worm 14 is mounted on shaft 15 (Fig. 3) which is supported in a yoke 16 having a suitable at surface 17 against which spring 18 may be secured, as by bolt 19. Yoke 16 is rotatably supported in frame 11 but is normally maintained by springs 18, so that worm 14 is in contact with rack 13. Shaft 15 is eccentrically mounted with respect to yoke 16 and may be moved by rotating said yoke, so as to disengage worm 14 from cooperating rack on telescope 10. Pin 20 is provided in the end of said yoke in a position to be manually engaged for producing this rotational movement. Frame 11 is also provided with a split collar 21 which may be clamped about telescope 10 by bolt 22 after the desired adjustment has been obtained.

Frame 11 is slidably mounted on bracket 12 by means of a cooperating tongue and groove construction and may be adjusted relative to said bracket by rod 25 which is threaded in said frame and rotatably secured in said bracket as by removable yoke 26. Yoke 26 is pivoted about pin 27 and may be manipulated as by handle 28 for permitting rod 25 to be entirely withdrawn from bracket 12. Frame 11 will then be free to slide transversely of said bracket and may be removed entirely therefrom. When replaced, yoke 26 may again engage with rod 25 restoring the mechanism to its previous adjustment. Set screw 30 may be employed for locking rod 25 in position after the desired adjustment has been obtained.

Bracket 12 (Figs. 4 and 5) is provided with a groove which slidably cooperates with tongued bars 35 which are rigidly secured to a stationary member, such as framework 36. Bracket 12 is provided with a tongue 37 which cooperates with threaded rod 38 for controlling the longitudinal adjustment of said bracket. Rod 38 may be secured in suitable bearings in frame 36 and may be locked in any desired position by lock nut 39.

Telescope 10 may be provided at its end with a sleeve 40 which may be secured thereto by any desired means. Tubular member 41 is slidably mounted in said sleeve and is secured to an aperture member 42 which is provided with a tapered end adapted to seat in a corresponding recess in aperture plate 43. Spring 44, extending between sleeve member 40 and aperture member 42, serves to maintain the latter in firm engagement with said aperture plate 43. Collar 45 may be secured to aperture member 42 to protect and insure a proper seating of spring 44 and to provide a grip for adjusting the members. Aperture plate 43 may be of any desired construction and is associated with mechanism for continuously passing a photographic film 46 thereover.

Film 46 after being passed through the picture projection apparatus is formed into a loop 47, passed around idler pulley 48, over aperture plate 43, around continuous sprocket 49, lower loop 50 and feed sprocket 51 to a film magazine (not shown). Suitable mechanism may be employed for maintaining the film in contact with aperture plate 43 and with sprockets 48 and 49.

In the form illustrated, this mechanism comprises a pressure plate 55 which is adapted to hold the film in contact with idler sprocket 48 and is mounted upon pivoted member 56. Pressure plate 57 is adapted to hold the film against continuous sprocket 49 and is mounted on a second pivoted member 58. Pin 59 on member 58 cooperates with a slot on member 56 for providing unitary action of said members.

Film gate 60 is held in engagement with film 46 as it passes over aperture plate 43, by means of suitable springs 60a. A pair of telescoping members 61 and 62 are also provided for enclosing the path of the light rays between film gate 60 and chamber 63 containing photoelectric cell 64. Film gate 60 may be released by a yoke (not shown) operated by member 58. The film gate and the two pressure members are accordingly released by a single operation in response to movement of the pivoted member 58. The details of construction of the film gate and its associated parts, however, form no part of the present invention and will not be set forth in detail.

Lamps 70 are mounted in sockets 71 which are rotatably mounted in cooperating relationship with telescope 10. Sockets 71 are secured by screws 72 to sleeve 73 which is rotatable about bushing 74. Spring pressed detent 75, cooperating with grooves 76, secures sleeve 73 in its desired position. Bushing 74 is secured to slidable member 77 by nuts 78 and 79 which are threaded thereon. Contact strip 80 is adapted to make contact with the base of lamp 70 in socket 71 and is externally connected to stationary rod 81 which passes through insulating bushing 82 and terminates in round nut 83. Contact strips 84 and 85 make electrical contact with nuts 83 and 79 respectively and are connected to an external circuit (not shown) for supplying lamp 70.

Slidable member 77 is normally locked to frame 11 by means of pin 90 which is secured in said frame and spring pressed detent 91 which is pivotally mounted on member 77 as by rod 92 (Fig. 4). Said detent is provided at its free end with wing members 93 which are bent upwardly whereby said member may be readily applied over pin 90. Groove 94 in said member intermediate said wing sections 93 is adapted to pass over pin 90 and secure slidable member 77 and frame 11 in operating relationship. Grooved rods 95 and 96 may be utilized for locking member 77 and frame 11, respectively to bracket 12.

Lamps 70 may be selectively brought into operative position by rotating the supporting framework 180°. This permits a burned lamp to be replaced in the machine without interrupting the operation thereof. The relationship of the lamp sockets and sound telescope 10 is adjusted at the factory and, since there are no moving parts, no further adjustment should be necessary. The adjusting means above described, however, provides for rotatably adjusting said telescope with respect to aperture plate 43. Both the lamps and the telescope may then be moved transversely of said aperture plate. The elements may also be moved parallel to the axis of said telescope by moving bracket 12 on tongued members 35 which are secured to the framework 36 of the machine.

A machine constructed in accordance with the present invention preferably provides for the use of a wide film, a portion of which is set apart for the picture and another portion of which is utilized for a sound record. The sound record utilizes a strip on one side of the film which is capable of transmitting light of varying intensity, the variations corresponding to the sound waves which are to be reproduced. These are translated by a beam of light acting upon the photoelectric cell into a varying electric current which is utilized for the operation of a sound reproducing device. Loop 47 compensates for the difference in drive between the intermittent sprocket of the projection machine and the uniformly rotating sprocket which passes the film over the aperture plate 43 at a continuous speed. Said loop must be of the proper size to synchronize the sound and pictures, taking into consideration the displacement of the two telescopes and the speed of the film.

The transverse adjustment provides for properly aligning the light rays with respect to the photographic sound record on the film. The axial adjustment of said telescope provides for properly focusing the light rays through the film on to the photoelectric cell. Rotational movement of the telescope provides means for properly adjusting the lenses to compensate for any mechanical variations which may be contained therein. Vertical adjustment of telescope 10 other than a minor adjustment which may be obtained by varying the position of tongued member 35 with respect to arm 36, is not provided for, inasmuch as only a minor variation in the synchronization of the sound and picture would result. The apparatus should be so adjusted and designed at the factory that the distance between the picture aperture and the sound aperture corresponds to the displacement between the picture record and the sound record of the film being passed through the machine.

The sound reproducing mechanism above described has been shown in the present specification as forming a part of the projection head of a motion picture machine. The sound mechanism may, however, be operated independently of such machine or may be applied thereto as an attachment. Furthermore, the sound telescope and adjusting mechanism may be applied to other uses which will be apparent to those skilled in the art.

Although a specific embodiment of the invention has been shown and described for purposes of illustration, it is to be understood that various omissions, substitutions and changes in the forms and details of the device illustrated and in its operation, may be made by those skilled in the art without departing from the scope of the invention, which is not to be limited by the present specific description, but only in accordance with the following claims.

What is claimed is:

1. In a sound reproducing mechanism, a photographic sound record, means for continuously feeding said record past a sound aperture, a telescope for directing a ray of light upon said aperture, a framework supporting said telescope, means for adjusting said framework longitudinally and transversely with respect to said sound aperture, whereby the focal point of said telescope may be moved with respect to said sound record, and a photo-electric cell for receiving said light and translating the same into an electric current.

2. In a sound reproducing mechanism, a photographic sound record, means for continuously feeding said record past a sound aperture, a pair of light sources, means for mounting said sources comprising a pair of sockets rotatably supported and adapted to hold said sources at diametrically opposed points, means for rotating said sockets whereby said sources may be selectively brought into operative position, a telescope for directing a ray of light from one of said sources upon said aperture, means associated with said telescope for adjusting the focal point thereof with respect to said sound record, and a photo-electric cell for receiving said light and translating the same into an electric current.

3. In combination with a sound record, a source of light rays, a telescope for directing said light rays upon said record, and means for supporting said telescope comprising a slidable framework, a bracket for supporting said framework and means for slidably mounting said bracket, said bracket and said framework being slidable in transverse and longitudinal directions respectively.

4. In combination with a sound record, an aperture plate, means for passing said record over said aperture plate, a source of light, a telescope for directing light therefrom on said aperture, a light shield comprising telescoping members, one of said members being secured to said telescope, the other of said members containing a light directing aperture, and means for normally holding said second member in contact with said aperture plate.

5. In a sound reproducing mechanism, a frame, a telescope supported thereby, means for adjusting said telescope transversely, horizontally and vertically with respect to said frame, a light source carried by said frame and means for adjusting said light source horizontally with respect to said telescope.

6. In a sound reproducing mechanism, a frame, an aperture plate carried thereby, means for continuously passing a photographic sound record past said aperture plate, a light source mounted on said frame, a telescope for directing light rays from said source onto said aperture plate, means for adjusting said telescope and said light source as a unit transversely with respect to said sound record, means for adjusting said telescope axially to focus said light rays on said sound record, and means for adjusting said light source with respect to said telescope.

7. In a sound reproducing apparatus, means for mounting a photographic sound record, a telescope, a bracket supporting said telescope, an arm carried by said bracket and supporting a light source, said arm having electrical connections to said light source carried interiorly thereof, and means whereby rotary movement of said arm breaks the electrical connection to said source.

8. In a sound reproducing apparatus, means for mounting a photographic sound record, a telescope, a bracket supporting said telescope, an arm carried by said bracket and supporting a plurality of light sources, electrical connections to said light sources mounted interiorly of said arm, and means whereby rotary movement of said arm causes said light sources to be selectively positioned for cooperation with said telescope, and automatically completes the electrical circuit to the source so positioned.

9. In a sound reproducing apparatus, a framework, means for supporting a photographic sound record thereon, a bracket carried by said framework, a telescope and light source independently mounted on said bracket and slidably movable transversely of said sound record, and means for interlocking said light source and said telescope for unitary movement with respect to said bracket.

10. In a sound reproducing apparatus, a framework, means for supporting a photographic sound record thereon, a bracket carried by said framework, a telescope and light source independently mounted on said bracket and slidably movable transversely of said sound record, means for interlocking said light source and said telescope for unitary movement with respect to said bracket, said light source and telescope being removable from said bracket by continuous transverse movement in one direction, and means for interrupting the electric circuit to said light source in response to said movement.

LOUIS SIMON FRAPPIER.
EWALD BOECKING.